United States Patent
Ashwood-Smith (10) Patent No.: US 7,852,771 B2
(45) Date of Patent: Dec. 14, 2010

(54) METHOD AND APPARATUS FOR IMPLEMENTING LINK-BASED SOURCE ROUTING IN GENERIC FRAMING PROTOCOL

(75) Inventor: Peter Ashwood-Smith, Hull (CA)

(73) Assignee: Ciena Corporation, Linthicum, MD (US)

( * ) Notice: Subject to any disclaimer, the term of this patent is extended or adjusted under 35 U.S.C. 154(b) by 841 days.

(21) Appl. No.: 10/881,308

(22) Filed: Jun. 30, 2004

(65) Prior Publication Data
US 2006/0002304 A1    Jan. 5, 2006

(51) Int. Cl.
G08C 15/00    (2006.01)

(52) U.S. Cl. .................. 370/238; 370/395.5; 370/400; 370/536; 370/537; 370/545

(58) Field of Classification Search .................. 370/238, 370/351, 395.3, 389, 399, 397
See application file for complete search history.

(56) References Cited

U.S. PATENT DOCUMENTS

| | | | |
|---|---|---|---|
| 7,197,033 B2 * | 3/2007 | Reeves et al. ................ | 370/389 |
| 7,471,669 B1 * | 12/2008 | Sabesan et al. ............. | 370/351 |
| 7,477,594 B2 * | 1/2009 | Saleh et al. ................. | 370/225 |

OTHER PUBLICATIONS

Gorshe et al, Transparent generic framing procedure (GFP): a protocol for efficient transport of block-coded data through SONET/SDH networks IEEE Communications Magazine • May 2002.*
Generic Framing Procedure (GFP), ITU-T G.7041/Y.1303 Dec. 2001.*
S. Gorsche, *Transparent Generic Framing Procedure*, TechOnLine Publication, Nov. 2002, (10 pages).
J. Filch, et al., *Improving the Performance of Regular Networks with Source Routing*, (10 pages).

* cited by examiner

*Primary Examiner*—Seema S Rao
*Assistant Examiner*—Henry Baron
(74) *Attorney, Agent, or Firm*—Christopher & Weisberg, P.A.

(57) ABSTRACT

Link-based source routing may be implemented using generic framing protocol (GFP) to enable GFP frames to contain a switching context that will allow them to be forwarded on a network without requiring state information to be distributed to interior network elements on the network. Source routes may be computed from network topography information obtained using OSPF or ISIS. An extension header type is added to the GFP frames to signal to the network elements that the GFP frame contains a link-based source route. The source route contains a vector of tunnel IDs and a pointer to the current hop, to enable the current tunnel ID to be determined. The tunnel IDs have local significance only, and hence state information is not required to be distributed on the network. A return route may be built by index substitution as the frame traverses the network.

12 Claims, 4 Drawing Sheets

METHOD AND APPARATUS FOR IMPLEMENTING LINK-BASED SOURCE ROUTING IN GENERIC FRAMING PROTOCOL

BACKGROUND

1. Field

This application relates to communication networks and, more particularly, to a method and apparatus for implementing link-based source routing in generic framing protocol.

2. Description of the Related Art

Data communication networks may include various computers, servers, hubs, switches, nodes, routers, proxies, and other devices coupled to and configured to pass data to one another. These devices will be referred to herein as "network elements." Data is communicated through the data communication network by passing protocol data units, such as frames, packets, cells or segments, between the network elements by utilizing one or more communication links. A particular protocol data unit may be handled by multiple network elements and cross multiple communication links as it travels between its source and its destination over the network.

The various network elements on the communication network communicate with each other using predefined sets of rules, referred to herein as protocols. Different protocols are used to govern different aspects of the communication, such as how signals should be formed for transmission between network elements, various aspects of what the protocol data units should look like, and how protocol data units should be handled or routed through the network by the network elements.

To enable packets and frames of different protocols to be transported over a physical layer (layer 1) protocol such as T1, DSL, or SONET/SDH, a generic framing procedure has been developed. The Generic Framing Protocol (GFP) which defines the generic framing procedure specifies a GFP frame format that has a core header which specifies the length of the payload, and a payload area which may contain one or more client protocol frames/packets to be transported on the network. In frame-mapped GFP, a given client protocol frame/packet such as an IP packet or Ethernet Frame will be loaded into the GFP payload. In transparent GFP, a fixed number of client characters are mapped into a GFP frame of predetermined length. Several attractive features of GFP are that GFP is able to carry client protocol data units across the transport network without requiring modification of the client headers and that it may be used to carry multiple different types of traffic without notifying the underlying network what type of traffic is being transported.

Figure 1:
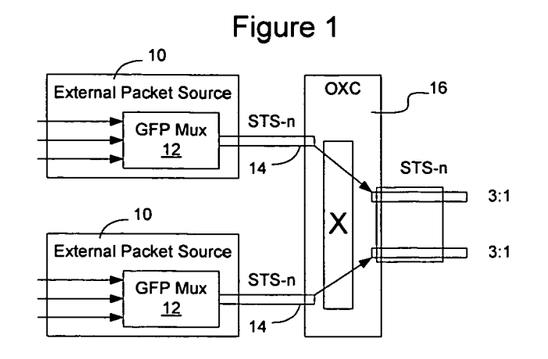
FIGS. 1-3 illustrate functional block diagrams of several examples of network elements that may operate to transport GFP frames on a SONET/SDH network.

When GFP frames are multiplexed into a SONET/SDH channel (STS-n) by an external packet source, the amount of bandwidth filled on the network core is limited to the size of the channel at the multiplexer. For example, FIG. 1 illustrates an example in which GFP frames are multiplexed by an external packet source 10 with a GFP multiplexer 12 onto an STS-n channel 14. Since the STS-n channel cannot be combined with other STS-ns without demultiplexing and remultiplexing the protocol data units, the STS-n channel will remain at the current fill level on the network even after passing through optical cross connects 16 and other network elements.

Figure 2:
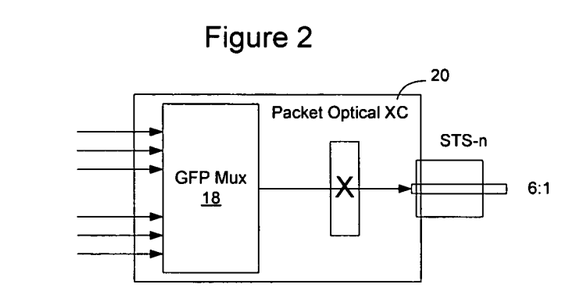

To increase fill on the network, it is possible to multiplex the GFP frames onto a SONET/SDH channel by including a GFP multiplexer 18 in the optical cross connect 20 and bringing GFP frames to the optical cross connect without multiplexing the frames onto an STS-n channel. In this manner, additional GFP frames may be placed on the same STS-n to increase the fill level on the STS-n channel.

Figure 3:
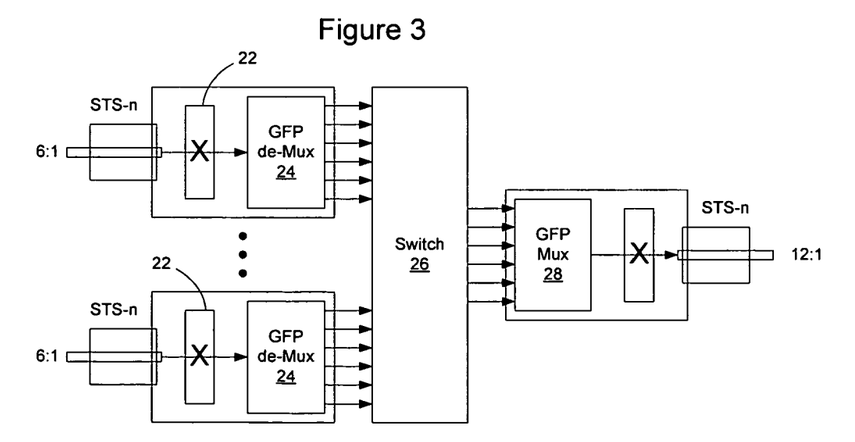

Another way to increase the fill level is to de-multiplex the GFP frames from the STS-n channels, switch/route the packets to an appropriate STS-n, and then re-multiplex the packets onto a new STS-n channel. An example of this is illustrated in FIG. 3. As shown in FIG. 3, when packets arrive they pass through an optical cross connect 22 to a GFP demultiplexer 24. The de-multiplexer terminates the original GFP frame flows and passes the packets or frames extracted from the GFP frame to a layer 2/3 switch/router 26. After the frames are switched/routed, the frames are passed to a GFP multiplexer 28, multiplexed onto a new STS-n channel, and passed onto the network over the new STS-n channel.

Handling GFP frames in this manner is not trivial, however, since the GFP frames may be carrying protocol data units formed using any number of different protocols. Thus, extracting the client protocol data units, reconstructing the client protocol data units, and performing routing using the protocol headers associated with the client protocol data units is not a trivial matter. It also represents a potential security lapse that may be unacceptable in particular contexts. Thus, extracting client protocol data units and performing routing based on the payload is at best very difficult and, at worst, defeats one of the purposes of GFP, which was to simplify transport of numerous different protocols across a network in a transparent manner.

Although a proposal has been made to add a new extension header type to GFP, which would allow the GFP frame to carry a label to allow the frame to be switched along a label switched path, the proposal requires state information to be distributed to network elements on the network, in a manner similar to Multi Protocol Label Switching (MPLS), to enable the labels to be used to forward the packets on the network. The state information, according to the proposal, would instruct the network elements as to the ingress/egress port/label relationship and would be distributed on the network via a signaling protocol. While this solution might be operable, it is a relatively intrusive way of enabling GFP frames to be switched on the network, since it requires state information to be distributed and maintained on the network elements throughout the network. Additionally, this solution also may experience problems with scaling as the number of nodes on the network increases and the level of traffic on the network is increased. Accordingly, it would be advantageous to provide a scalable way to switch GFP flows on a SONET/SDH network.

SUMMARY OF THE DISCLOSURE

Link-based source routing may be implemented using a framing procedure such as the procedure defined by Generic Framing Protocol (GFP) to enable the GFP frames to contain a switching context that will allow the GFP frames to be forwarded on a network without requiring state information to be distributed to interior network elements on the network. Source routes may be computed by edge nodes or a central controller from network topography information, which may be obtained from a protocol such as OSPF or ISIS or another conventional protocol. According to an embodiment of the invention, an extension header type is added to the GFP frames to signal to the network elements that the GFP frame contains a link-based source route. The link-based source route may contain a vector of tunnel IDs, and a pointer to the current hop to enable a network element receiving a GFP frame to determine which tunnel ID should be used to forward the GFP frame at that hop. Alternatively, the link-based source route may contain a vector of tunnel IDs that shrinks as the frame is passed through the network. The tunnel IDs have local significance only, and hence state information is not required to be distributed on the network. The tunnel IDs identify logical or physical links on the network.

To provide a return route, the network elements may be configured to insert input tunnel ID information into the GFP frame or replace the previous tunnel ID with the local ingress tunnel ID to build a return path through the network for the GFP frame so that bi-directional traffic paths may be created. Alternatively, a reverse source route may be computed directly using the distributed network topography information.

BRIEF DESCRIPTION OF THE DRAWINGS

Aspects of the present invention are pointed out with particularity in the claims. The following drawings disclose one or more embodiments for purposes of illustration only and are not intended to limit the scope of the invention. In the following drawings, like references indicate similar elements. For purposes of clarity, not every element may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

As described in greater detail below, GFP frames may contain link-based source route information to enable the GFP frames to contain a switching context that will allow the GFP frames to be forwarded on a network without requiring state information to be distributed to interior network elements on the network. Source routes may be computed by edge nodes or a central controller from network topography information, which may be obtained from a protocol such as OSPF or ISIS or another conventional protocol.

According to an embodiment of the invention, an extension header type is added to the GFP frames to signal to the network elements that the GFP frame contains a link-based source route. The link-based source route may contain a vector of links, referred to herein as tunnel IDs, and a pointer to the current hop to enable a network element receiving a GFP frame to determine which tunnel ID should be used to forward the GFP frame at that hop. Alternatively, the link-based source route may contain a vector of links that shrinks as the frame is passed through the network as the network elements handling the frame remove the link(s) specific to that network element. The tunnel IDs have local significance only, and hence state information is not required to be distributed on the network. The tunnel IDs identify logical or physical links on the network, such as a link attached to a physical port, a group of links accessible through a group of ports, a logical link accessible through a logical association of ports within the network element, a link associated with a particular physical feature within the network element, or any other type of logical or physical feature.

A network element receiving a GFP frame may look up the tunnel ID of the current hop to determine an exit port or interface over which the GFP frame should be forwarded. To provide a return route, the network elements may be configured to insert the input tunnel ID information into the GFP frame or to replace the previous tunnel ID with the local ingress tunnel ID to thereby build a return path through the network for the GFP frame. The destination will thereby receive a frame with a GFP usable reverse source route. Alternatively, a reverse source route may be computed directly using the distributed network topography information.

A network topography distribution mechanism, such as OSPF, ISIS, or another protocol, may be used to distribute locally assigned tunnel ID information on the network using link state advertisements in a known fashion. Although OSPF and ISIS may be mentioned occasionally herein, the invention is not limited to an embodiment that uses one of these protocols. The information distributed by the network topography distribution mechanism may include tunnel ID information that has local significance to the network element. This information may be similar to unnumbered link ID information currently distributed by OSPF using link state advertisements, or may include other information. The network information may be collected by area border routers or a central management station to enable a network topography database to be built containing the network topography, so that routes through the network may be determined. The routes may be converted into a list of tunnel IDs representative of a path through the network. These tunnel IDs may be added to the GFP frame as a source route which then may be used by the internal network elements to route the GFP frame through the network. Since the interior nodes are provided with locally assigned information directing the network elements how to forward the GFP frame, the interior nodes are not required to be provided with state information. Thus, MPLS/ATM signaling is not required to be implemented on the network.

Figure 4:
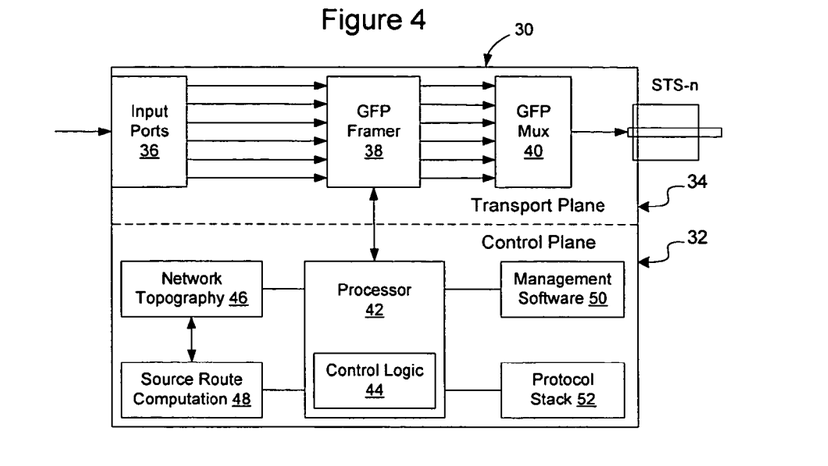
FIG. 4 is a functional block diagram of an example of an edge network element that may be configured to implement an embodiment of the invention.

FIG. 4 illustrates an embodiment of an edge network element 30 that may be configured to implement an embodiment of the invention. As shown in FIG. 4, the edge network element includes a control plane 32 and a transport plane 34. The transport plane generally includes input ports 36 to receive data to be transported on the network, a GFP framer 38 to frame the data for transport on the network, and a GFP multiplexer 40 configured to multiplex the frames and output them onto the network. According to an embodiment of the invention, the GFP framer operates under the direction of the control plane to provide source route information in the GFP frames to enable the GFP frames to contain source routing information to be used by the interior network elements to switch/route the GFP frames through the network. Where the input data is previously framed, the GFP framer may perform the step of inserting source routing information without performing additional framing operations. For example, the GFP framer may take a previously encapsulated GFP frame without a source route and then add the source routing header.

The control plane generally includes a processor 42 containing control logic 44 configured to program the transport plane to handle data on the network. The control plane generally may include several functional modules to enable the edge network element to generate source routes for use by GFP frames on the network. For example, in the embodiment illustrated in FIG. 4, the control plane includes network topography database 46 and source route computation module 48 to allow source routes to be computed for GFP frames. Where the source routes are generated by a centralized management station or other network centric control schema, the network topography and source route computation modules need not be included and may be consolidated to a source route data structure or other type of source route information module. The invention is not limited to where, on the network element or network as a whole, the network topography and source route computation calculations are maintained and performed. The control plane may also include other modules such as a management software module 50 and optionally a protocol stack 52, which enable the network element to be controlled/interfaced by a network manager, and allow the network element to participate in protocol exchanges on the network. The invention is not limited to an embodiment including only these modules or all of these modules as the network element may be configured in many different ways.

Figure 5:
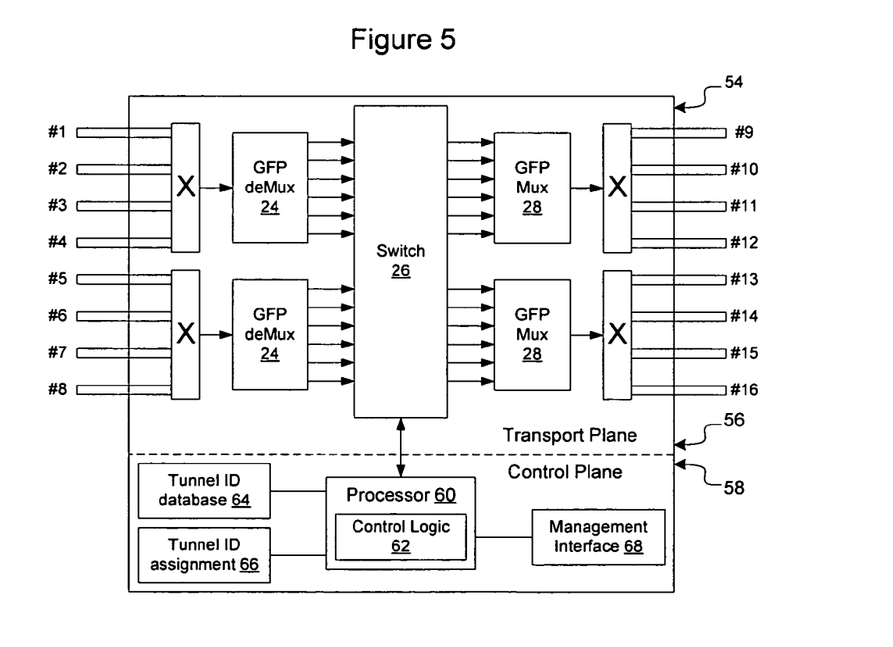
FIG. 5 is a functional block diagram of an example of an interior network element that may be configured to implement an embodiment of the invention.

FIG. 5 illustrates an embodiment of an internal network element 54 configured to handle GFP frames with frame-contained link-based source routing information. As shown in FIG. 5, the network element includes a transport plane 56 and a control plane 58. The control plane, in the network element illustrated in FIG. 5, is relatively less complicated than the control plane 32 of the edge network element illustrated in FIG. 4, since the control plane is not required to have information about source routes, network topography, or other state information related to flows on the network.

In the embodiment illustrated in FIG. 5, the control plane includes a processor 60 containing control logic 62 configured to implement tunnel ID assignments on the network element and program those tunnel ID assignments into the transport plane. The control plane also contains a database of tunnel ID assignments 64 to be used by the network element to associate tunnel IDs with physical or logical resources on the network element. Optionally, the control plane may also include one or more additional modules, such as a tunnel ID assignment module configured to perform new tunnel ID assignments and a management interface 68 to allow the network element to be managed by a network manager.

The tunnel IDs may refer to a link attached to a port of the network element, or may refer to a logical link which may be a group of links on the network. For example, in FIG. 5, the network element has 8 input links (#1-8) and 8 output links (#9-16). The transport plane includes one or more GFP demultiplexers 24 configured to demultiplex GFP frames received over the input links, a switch 26 configured to switch the GFP frames according to the frame contained link-based source route information, and one or more GFP multiplexers 28. The GFP frames are then output over one or more of the output links.

The source route information contained in the GFP frame may be associated with the output link, the output port over which the GFP frame is to be output, an internal queue that should be used to handle the GFP frame, or another logical way in which the GFP frame should be handled. Optionally, the GFP frame may contain multiple link IDs indicative of different internal substructures that should be used to handle the GFP frame. For example, where the network element has multiple GFP multiplexers and multiple switches, the tunnel IDs may be used to specify which of these internal paths should be used to handle the GFP frame. In this instance, the tunnel ID may specify an internal "link" within the network element as well as or instead of an external link over which the GFP frame ultimately will be transmitted. For example, the network element could advertise sets of tunnel IDs, e.g. to get to link 13 the source route should include tunnel ID 24 (which corresponds to internal switch element 24), tunnel ID 27 (which corresponds to egress card 27), and tunnel ID 13 (which corresponds to link 13The invention is not limited in the manner in which the tunnel IDs are assigned, but rather encompasses numerous manners of link ID assignment that enable input frames to be mapped to a physical or logical egress of the network element.

The control logic for the edge network element 44 and for the interior network element 62 may be implemented as a set of program instructions that are stored in a computer readable memory within the network element and executed on a microprocessor, such as processor 42, 60, respectively. However, it will be apparent to a skilled artisan that all logic and the functional aspects of operation of the network elements described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

Figure 6A:
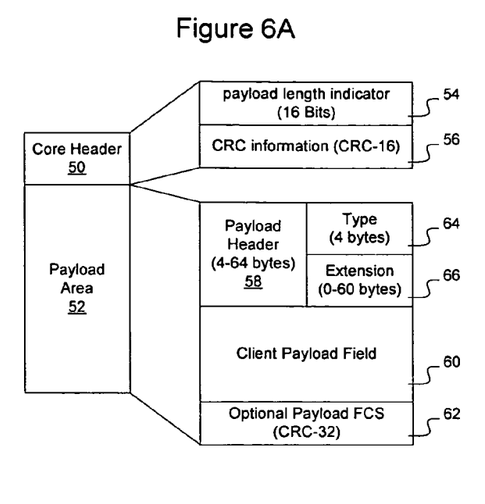
FIG. 6A is a diagram of a GFP frame according to the GFP standard.
Figure 6B:
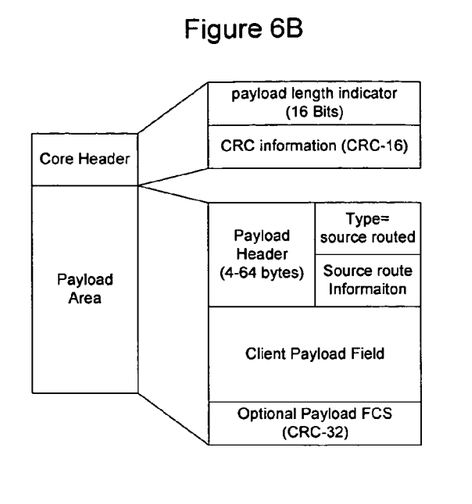
FIG. 6B is a diagram of a GFP frame according to an embodiment of the invention.

FIG. 6A illustrates the GFP frame structure, and FIG. 6B illustrates one possible way in which the standard GFP frame structure modified to include a source routed extension. The embodiment illustrated in FIG. 6B is only one possible embodiment, and the invention is not limited to this particular embodiment as the source routing information may be contained at other locations within the GFP frame structure.

As shown in FIG. 6A, the GFP frame structure generally includes a core header 50 and a variable size payload area 52. The core header contains a two byte payload length indicator 54 and a cyclic redundancy check (CRC) field 56 for the GFP frame, or another type of check for the GFP frame or GFP header. For example, the CRC may apply to the body and a longitudinal check sum may be provided for the header to allow the header to be updated and the check field to be updated as the frame traversed the network. The invention is not limited to the manner in which the frame check is performed. The GFP frame payload area 52 includes a payload header 58, a client payload field 60 which may contain one or more packets or frames formatted according to the client protocol such as Ethernet or Internet Protocol (IP), and an optional payload forward correction sequence field 62. The payload header is configured, according to the GFP standard, to include two fields, a four byte type field 64, and an optional extension field 66 which may be between 0 and 60 bytes in length.

According to an embodiment of the invention, as shown in FIG. 6B, a source routed type 64' is defined and used to populate the type field 64 of the payload header 58. The extension field 66, according to this embodiment, is used to carry the source routing information 66' for the GFP frame. The extension header type thus may be added to the conventional GFP frame format without requiring a change in the structure or format of the basic GFP framework. Rather, an available field may be used to indicate that the frame is a source routed GFP frame, and that the extension field contains the source routing information for the frame. The source routing information contains a variable sized list of tunnel ID which are also variable sized by extension bits. Additionally, the extension contains an index of the current tunnel ID to allow the network elements to determine which portions of the source routing information is significant to that particular network element.

A tunnel ID is a locally significant index to an unnumbered link ID and may represent a logical or physical port on the network element. Since the tunnel IDs are locally significant, state information is not required to be distributed to enable the network elements to use the tunnel ID information. Additionally, the tunnel IDs are not coordinated between network elements, and thus the tunnel IDs will therefore by different at each end of a link. Specifically, network elements on opposite ends of the same link will generally refer to the link using different tunnel IDs, since each network element will assign locally significant identifiers and there is no coordination of tunnel ID assignment or convention between network elements. The logical port may be LCAS controlled VCAT set of STS-n's or one STS-n.

A network topography distribution mechanism such as OSPF or ISIS (with or without TE extensions) may be used to distribute the Tunnel IDs as unnumbered link indexes. The network topography information may be used to compute routes through the network in a standard way, and the link indexes may then be used by the head end network elements to specify a link-based source route for the GFP frames along the routes. The link-based source route may be included in an accessible portion of the GFP frame to allow the GFP frame to be switched/routed through the network.

The GFP frames may contain additional information, such as separate fields indicative of packet treatment for discard/emission in the header extension 66' to allow quality of service to be implemented on the network. Forward congestion information and backward congestion information also (on a per hop basis or end-to-end) may be added to the GFP frame to signal traffic conditions to the edge network elements to allow the edge network elements to bypass congestion at a particular hop. Although a particular example of a GFP frame format has been provided herein to illustrate an example embodiment of the invention, the invention is not limited to this particular embodiment as many other frame formats may be used as well.

Figure 7:
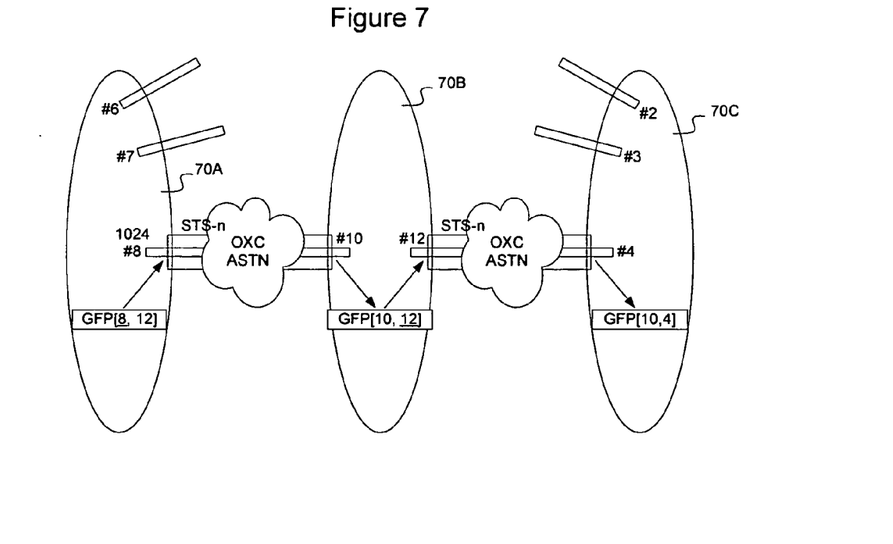
FIG. 7 is a functional block diagram illustrating the flow of a GFP frame through a network according to an embodiment of the invention.

FIG. 7 illustrates the flow of a GFP frame through an example network according to an embodiment of the invention. As shown in FIG. 7, a GFP frame to be transported on the network is provided with source route information corresponding to link or tunnel IDs at each of the switching points on the network to allow the GFP frame to carry a link-based source route. Thus, for example, in the illustrated embodiment, the GFP frame will be switched by two switching points on the network 70A and 70B. The GFP frame will be received by switching point 70C as well, but since in this example switching point 70C is the terminating switching point, source routed information is not required to instruct the terminating switching point 70C how to handle the GFP frame. Optionally, the one or more source route fields may be used by the network element 70C to accelerate processing of the GFP frame by that network element.

In the example illustrated in FIG. 7, the GFP frame initially contains source route information [8, 12]. This indicates to the switching points that the frame should be transmitted over the port/interface associated with local tunnel ID 8 at the first switching point 70A and over the port/interface associated with local tunnel ID 12 at the second switching point 70B. Since the local tunnel IDs are not globally unique, a pointer is contained within the GFP frame to indicate which source route index is to be used by the switching point receiving the frame. Where the network element has opted to use multiple indexes to specify internal handling of the GFP frame, the pointer may point to the first index for use by the network element. In the example illustrated in FIG. 7, the value of the pointer is indicated by underlining the local tunnel ID information. Thus, for example, in switching point 70A, the index indicates that the GFP frame should be transmitted over port/interface 8. When the switching point 70A transmits the GFP frame over port/interface 8, it will update the pointer to point to the next index in the source route information.

According to another embodiment of the invention, the source route contains a list of tunnel IDs that shrinks as the GFP frame traverses the network. Specifically, the network elements handling the GFP frame may be configured to remove the tunnel ID(s) as they are used on the network. In this manner, the tunnel ID in the first position will always be the tunnel ID to be used by the subsequent network element and a pointer may be eliminated. For example, tunnel IDs may be stacked on the GFP frame in a manner akin to an Multi Protocol Label Switching (MPLS) label stack, with each network element removing the outer label. The invention is not limited to the particular manner in which identification of the present tunnel ID is implemented.

When the GFP frame is received at a subsequent switching point 70B, the switching point will read the source route information at the location indicated by the source route index pointer which, in the indicated example, is pointing to location number 2. Thus, the switching point 70B will determine from location 2 in the source route information that the GFP frame is to be transmitted over the port/interface associated with local tunnel ID [12], and output the GFP frame accordingly. As before, the switching point 70B will increment the source route index pointer to the next index in the source route information. This process will iterate as the GFP frame traverses the network.

Optionally, to allow a reverse path to be built, the switching points may be configured to insert the ingress tunnel ID information into the GFP frame or to replace the previous index in the source route information with the ingress tunnel ID over which the GFP frame arrived. For example, assume that a GFP frame arrived at switching point 70B with source route information GFP[8,12]. The only index that has any local significance to switching point 70B is index number 2, which in this case is set to local tunnel ID [12]. The GFP frame arrived at a link that in this case came in over port/interface [10]. If the switching point is configured to insert the ingress tunnel ID into the GFP frame or to replace the index before the current switching index with the input port/interface, a reverse source route may be built as the GFP frame traverses the network. Specifically, in this example, switching point 70B would replace index #1 with the input port/interface [10] so that the source route information associated with the GFP frame is changed from GFP[8,12] to GFP[10,12]. The GFP frame is then forwarded to switching point 70C. Switching point 70C would perform the same operation to replace the previous index used by switching point 70B with the input index at switching point 70C, to change the source route information from GFP[10,12] to GFP[10,4] since in this example the input tunnel ID over which the frame arrived is identified by switching point 70C as local tunnel ID [4]. Thus, a reverse source route may be built through the network to allow reply traffic to use the same path as the original traffic.

When a destination network element corresponding with a final source route index receives a frame, it may perform one or more checks to verify that the frame has been properly forward on the network. For example, the source route may be verified, e.g. by checking that the tunnel ID of the previous hop is the correct reverse ID for the tunnel ID of the link on which the frame arrived. Similarly, the frame may be reviewed by passing the frame to an upper layer for processing to determine whether the client protocol data unit has been forwarded to the proper destination. One of these or another mechanism may be used to prevent erroneous or corrupted routing from distributing frames on the network. The invention is not limited to these particular mechanisms as numerous other types of validity checks may be used as well. Where the frame doesn't pass the validity check, the frame may be discarded or otherwise handled by the network element in an appropriate manner. Optionally, the number of invalid frames may be measured and reported by the network element.

Figure 8:
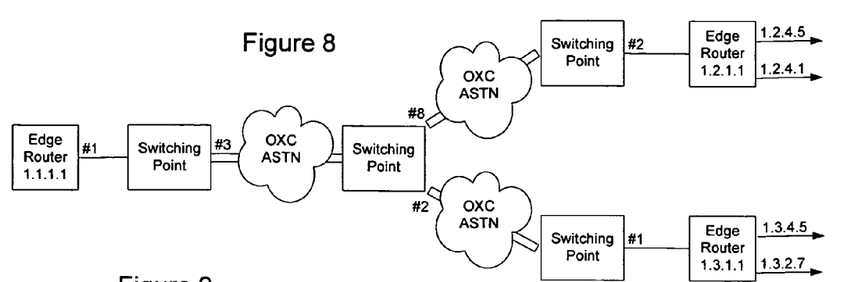
FIG. 8 is a functional block diagram illustrating the distribution of routing information and path information on a network according to an embodiment of the invention.
Figure 9:
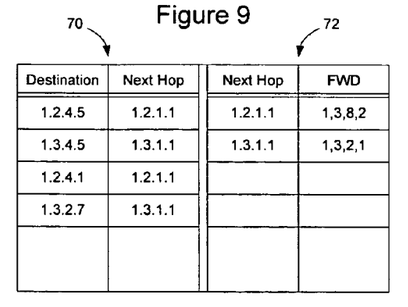
FIG. 9 is a data structure maintained by an edge router to enable the edge router to source route GFP frames on the network according to an embodiment of the invention.

FIG. 8 illustrates a portion of an example network having several edge routers configured to source route GFP frames across several automatically switched transport networks interconnected by switching points. FIG. 9 illustrates an example of routing information that may be collected by edge router 1.1.1.1. Similar routing tables may be built by the other edge routers. Network topography information, such as the forwarding information, may be exchanged with a network topography distribution mechanism such as OSPF or ISIS. Route reachability information may be exchanged by any conventional routing protocol, such as Border Gateway Protocol (BGP). The invention is not limited to these particular protocols, however, as numerous protocols may be used.

Switching nodes in the core of the network, intermediate the head-ends, do not participate in signaling or exchanging state information to establish connections on the core of the network. Rather, the interior switching nodes pass state information between edge nodes to allow state information to be established on the edge nodes on the network. Additionally, the interior switching nodes distribute their local/remote tunnel IDs using a protocol such as OSPF or ISIS. The head ends (edge routers) collect OSPF route advertisements to build a graph of tunnels on the network. The head end nodes compute source routes against this graph of tunnels and insert source route headers into GFP frames to allow the GFP frames to be forwarded over the path. Alternatively, the head-end nodes may go to a centralized location for route computation. The invention is not limited to where on the network the routes are computed.

Head end nodes may exchange their resource usage with other head ends to allow traffic engineering to be performed on the network. Alternatively, a central control monitor may be used to compute paths and take congestion and network usage into account in assigning paths on the network. The invention is not limited to an embodiment that incorporates traffic engineering as numerous mechanisms may be used to allocate routes on the network.

Failure recovery may rely on the network itself, such as protection mechanisms inherent to SONET/SDH to perform protection for the path on the network. Alternatively, failure recovery may be performed by causing the head ends to place the traffic on alternative paths through the network. Other forms of failure recovery, such as local detours or source routing substitution by the network elements, may be performed as well and the invention is not limited to any particular implementation of failure recovery.

In the embodiment illustrated in FIG. 8, edge router 1.1.1.1 receives OSPF link state advertisements from switching points 1-4, and receives routing updates from edge routers 1.2.1.1 and 1.3.1.1. Edge router 1.1.1.1 therefore may build a database containing two tables: a routing table 70 correlating destination/next hop information, and a forwarding table 72 containing source routes for those next hops. The destination/next hop table allows the edge router to correlate destinations, or routes, with a next hop, i.e. a next edge router, on the network. Thus, in the example shown in FIG. 8, if the edge router would like to send a GFP frame to address 1.2.4.5, it may use the address to key into the routing table 70 to obtain the next hop information for that destination which, in this example, corresponds to edge router 1.2.1.1.

However, knowing the next hop is not enough to forward the packet onto the network, since the edge router will need to create a source route to get the GFP frame to the next hop. Accordingly, the edge router will use the next hop information, i.e. a next edge router, to key into the forwarding table to determine a source route to be used to get the frame to the next edge router. In the illustrated example, the source route for next hop 1.2.1.1 is [1,3,8,2]. Accordingly, the GFP header will be configured to include source route [1,3,8,2] and the GFP frame will be forwarded on the network. In a similar manner, if the edge router 1.1.1.1 wanted to send a GFP frame to route 1.3.2.7, it would obtain a source route [1,3,2,1]. The invention is not limited to this embodiment, as a single table, a linked table, or other data structures, may be used to maintain this information or similar information as well.

Figure 10:
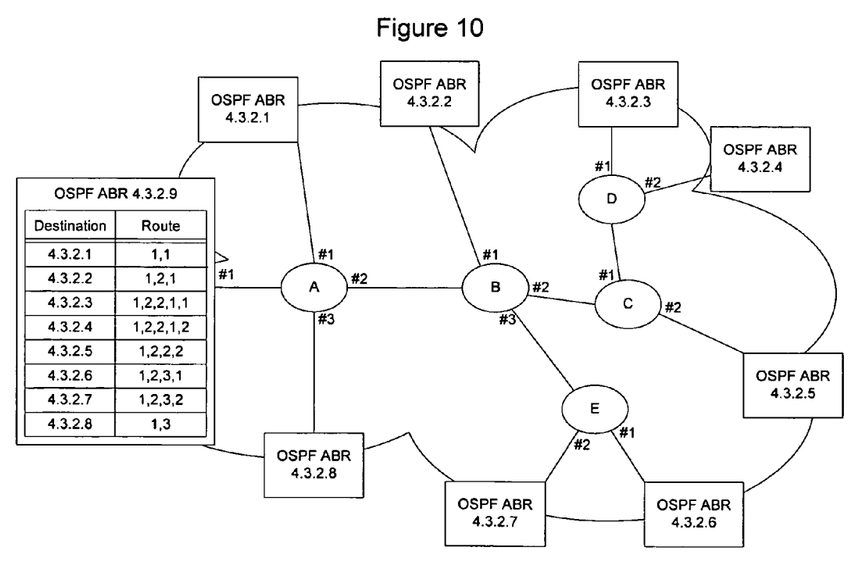
FIG. 10 illustrates an example of a network and the exchange of routing information in the network according to an embodiment of the invention.

FIG. 10 illustrates another embodiment of the invention in which an OSPF area border router includes a table of destination area border routers and a corresponding source route through the backbone to reach that area border router. Routes reachable through the area border router would all use the same source route and hence have not been illustrated so as not to obscure the invention.

In the example illustrated in FIG. 10, the OSPF area border router 4.3.2.9 includes a table indicating the source route to all other area border routers reachable by it over tunnel ID 1. Similar tables may be created for other areas reachable over other tunnel IDs. Optionally, the illustrated table and the tables for the other areas may be included in a single table, and the invention is not limited to the manner in which the tables are formed.

As shown in FIG. 10, OSPF area border router 4.3.2.1 is reachable over tunnel ID 1 from Open Shortest Path First (OSPF) Area Border Router (ABR) 4.3.2.9, and over tunnel ID 1 from switching point A. Thus, the source route from OSPF ABR 4.3.2.9 to OSPF ABR 4.3.2.1 is [1,1]. Similarly, OSPF ABR 4.3.2.8 is reachable over tunnel ID 1 from OSPF ABR 4.3.2.9, and over tunnel ID 3 from switching point A. All other ABRs are reachable over tunnel ID 2 from switching point A. These connections are exchanged via OSPF to enable the ABRs to build up the network topography and create source routes using advertised local tunnel ID information. The edge router may compute the source routes using standard point to point OSPF, except that instead of maintaining an interface as a forwarding entry, it maintains a list of indexes as the forwarding entry. Since OSPF is already configured to distribute unnumbered link IDs, this information may be distributed using standard OSPF. This allows the core to only advertise tunnel topography and operate as a very high performance OSPF area of core routers. The edge routers to the optical core may thus be configured as area border routers that computer source routes to other area border routers using only the OSPF topography, which is provided to the area border routers without requiring modifications to OSPF.

Where one edge router (initiator) does not know the source route to another edge router (target), it may use a form of Address Request Procedure (ARP) request to obtain the address. For example, assume that initiator edge router 4.3.2.2 does not know the source route to target edge router 4.3.2.6, and it would like to forward traffic to a route reachable over the target. According to an embodiment of the invention, the initiator may issue an ARP request onto the network with a target indication of target edge router 4.3.2.6 or a target indication of the intended route. The ARP request will be broadcast on the network by causing the switching points to output the ARP request on each port. As the ARP request is forwarded on the network, the source route will be built by causing the switching points to update the source route information with the tunnel ID over which the ARP request was received. For example, when the ARP request is received at switching point B, switching point B will update the source route to contain source route information [1,0] and forward the ARP request over all of its ports (optionally excepting the port over which the ARP request was received). When switching point E receives the ARP request, it will update the source route information contained in the ARP request so that the source route information is now [1,6,0] and forward the ARP request over all of its ports, again optionally excluding the port over which the ARP request was received. The target network element will ultimately receive the ARP request and will update the source route information in the ARP request to reflect the port over which the ARP request was received. In this example, if the ARP request is then received by OSPF ABR 4.3.2.6 on port 4, the reverse source route collected by the ARP request as the ARP request traversed the network would be [1,6,4]. The ARP request thus contains a source route for a path from the target to the initiator.

When the ARP request reaches the target, the target recognizes the ARP request, and issues an ARP response to the initiator. The ARP response is a unicast frame and is provided with the source route for the path from the target to the initiator. As the ARP response traverses the path from the target to the initiator, the source route information will again be exchanged to build a source route from the initiator to the target. In this manner, an ARP request may be multicast onto the network, and a unicast response may be provided to the initiator with a source route to the intended target.

The ARP request may include an ARP reference number to prevent a given switching point from forwarding an ARP request more than once to thereby minimize looping and iterative forwarding of the same ARP request on the network. Other mechanisms may be used as well and the invention is not limited to any particular manner in which looping is prevented from occurring on the network.

To enable ARP requests to work as described, a broadcast mechanism will need to be implemented on the network. This may be performed using a wildcard value, such as "0" or another value, which would indicate to the switching point that the GFP frame is to be output on all ports. When a switching point receives a GFP frame with a wildcard value in its index slot, it will replace the wildcard index with the tunnel ID of the port over which the GPF frame was received and output the frame over all other ports. There is no reason to output the GFP frame over the input port unless it is to be transmitted back toward the originating area border router. The switching point will also add an additional switching index, for use by a subsequent switching point, and set that index value to the wild card. Alternatively, the initial source route may contain a predetermined number of switching indexes, each of which may be set to the wild card value, to cause the GFP frame to propagate a particular number of hops on the network and then cease to be forwarded.

The use of a wildcard value in the switching index represents a restriction on the available tunnel ID values assignable by the switching points, since the switching points will not be able to assign those values to links connected to the network element. Although only one wildcard value has been discussed herein, other reserved values may be implemented as well, and the invention is not limited to an embodiment with only one wild card function. For example, other wild cards may be used to implement loopback, Operation, Administration, and Maintenance (OAM) functions, and other functions on the network.

It should be understood that various changes and modifications of the embodiments shown in the drawings and described herein may be made within the spirit and scope of the present invention. For example, the invention may be used with other framing protocols other than the above-mentioned Generic Framing Protocol, and the invention is not limited to an implementation that uses GFP. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of forwarding frames at an intermediate network element on a communication network, the method comprising the steps of:

receiving a Generic Framing Protocol (GFP) frame containing source route information at the intermediate network element from a connection having a first bandwidth, the source route information enabling the GFP frame to contain a switching context that will allow the GFP frame to be forwarded on the network by the intermediate network element without requiring state information to be previously distributed to the interior network element on the network;

extracting, by the intermediate network element, at least a portion of the source route information from the GFP frame; and using, by the intermediate network element, said at least a portion of the extracted source route information to multiplex the frame with other GFP frames from other connections onto a second connection having a second bandwidth larger than the first bandwidth, and to forward the frame along with the other GFP frames on the second connection;

wherein the source route information comprises a set of two or more egress tunnel IDs, at least one of which has local significance to the intermediate network element to enable the intermediate network element to identify the second connection.

2. A method of forwarding frames at an intermediate network element on a communication network, the method comprising the steps of:

receiving a Generic Framing Protocol (GFP) frame containing source route information at the intermediate network element from a connection having a first bandwidth, the source route information enabling the GFP frame to contain a switching context that will allow the GFP frame to be forwarded on the network by the intermediate network element without requiring state information to be previously distributed to the interior network element on the network;

extracting, by the intermediate network element, at least a portion of the source route information from the GFP frame to identify a second connection on which to forward the GFP frame, the second connection having a second bandwidth higher than the first bandwidth; and using, by the intermediate network element, said at least a portion of the extracted source route information to multiplex the GFP frame with other GFP frames on the second connection;

wherein the source route information comprises a plurality of tunnel IDs and a pointer to at least one of the tunnel IDs.

3. The method of claim 2, wherein the pointer determines the at least a portion of the source route information to be extracted from the GFP frame.

4. The method of claim 3, wherein the step of extracting at least a portion of the source route information comprises reading the portion of the source route corresponding to the pointer.

5. The method of claim 1, wherein the step of extracting at least a portion of the source route information comprises removing a portion of the source route from the GFP frame.

6. The method of claim 5, wherein the portion is an outside portion of the GFP frame.

7. The method of claim 1, further comprising the step of inserting input link information into the GFP frame to contribute to a reverse source route through the communication network.

8. The method of claim 7, wherein the step of inserting input link information comprises replacing a portion of the source route information.

9. A network hardware device configured to multiplex Generic Framing Protocol (GFP) frames received from multiple lower bandwidth connections onto a higher bandwidth connection, comprising:

a plurality of input ports connected to input links to receive GFP frames on the multiple lower bandwidth connections;

a GFP demultiplexer configured to demultiplex the GFP frames received over the input links;

a switch to receive GFP frames from the GFP demultiplexer and to switch the GFP frames according to link-based source route information contained within the GFP frames; and a GFP multiplexer to receive GFP frames associated with the multiple lower bandwidth connections from the switch and to multiplex the GFP frames onto the higher bandwidth connection associated with an output link;

wherein each of the GFP frames includes a core header and a payload area, at least one of the core header and payload area contains at least one link-based source routing index relevant to at least one intermediate network element on the communication network along a path between a source and a destination to enable the at least one intermediate network element to make at least one forwarding decision for the GFP frame on the communication network, the source route information enabling the GFP frame to contain a switching context that will allow the GFP frame to be forwarded on the network by the intermediate network element without requiring state information to be previously distributed to the interior network element on the network;

wherein the payload area comprises at least one client protocol data unit; and wherein at least one of the core header and payload area contains a pointer to a current index, said current index corresponding to at least one of said at least one link-based source routing index.

10. The network hardware device of claim 9, wherein the core header comprises a length indicator field and a validity check field.

11. The network hardware device of claim 9, wherein the payload area comprises a payload header and a payload field, and wherein the payload header comprises the at least one link-based source routing index.

12. The network hardware device of claim 11, wherein the payload area further comprises a forward error correction field.

* * * * *